US011307080B2

(12) United States Patent
Siren

(10) Patent No.: US 11,307,080 B2
(45) Date of Patent: Apr. 19, 2022

(54) METHOD AND SYSTEM FOR DETERMINING THE WEIGHT OF A DEMOUNTABLE PLATFORM

(71) Applicant: Hiab AB, Kista (SE)

(72) Inventor: Pasi Siren, Kirjala (FI)

(73) Assignee: Hiab AB, Kista (SE)

( * ) Notice: Subject to any disclaimer, the term of this patent is extended or adjusted under 35 U.S.C. 154(b) by 87 days.

(21) Appl. No.: 16/575,429

(22) Filed: Sep. 19, 2019

(65) Prior Publication Data

US 2020/0096383 A1 Mar. 26, 2020

(30) Foreign Application Priority Data

Sep. 20, 2018 (EP) .................................... 18195700

(51) Int. Cl.
| | |
|---|---|
| *G01G 19/10* | (2006.01) |
| *G01G 19/12* | (2006.01) |
| *B60P 1/64* | (2006.01) |
| *G01G 19/08* | (2006.01) |

(52) U.S. Cl.
CPC .......... *G01G 19/083* (2013.01); *B60P 1/6463* (2013.01); *G01G 19/10* (2013.01); *G01G 19/12* (2013.01)

(58) Field of Classification Search
CPC ...... G01G 19/083; G01G 19/10; G01G 19/13; B60P 1/6463
See application file for complete search history.

(56) References Cited

U.S. PATENT DOCUMENTS

| | | | | |
|---|---|---|---|---|
| 3,857,452 A | * | 12/1974 | Hartman ................ | G01G 19/12 177/139 |
| 3,971,451 A | * | 7/1976 | Norberg ................. | G01G 19/08 177/1 |
| 4,347,903 A | * | 9/1982 | Yano ...................... | G01G 17/08 177/185 |
| 5,070,953 A | | 12/1991 | Kyrtsos | |
| 5,290,138 A | | 3/1994 | Smart | |
| 5,509,293 A | | 4/1996 | Karumanchi | |

(Continued)

FOREIGN PATENT DOCUMENTS

| | | |
|---|---|---|
| DE | 4140344 A1 | 6/1993 |
| EP | 1702792 A2 | 5/2011 |

(Continued)

OTHER PUBLICATIONS

European Search Report for EP Application No. 18 19 5700 dated Mar. 6, 2019 (2 pages).

(Continued)

*Primary Examiner* — Randy W Gibson
(74) *Attorney, Agent, or Firm* — Merchant & Gould P.C.

(57) ABSTRACT

The present invention relates to a method for determining the weight of a demountable platform. In the method, a hooklift is used to lift the demountable platform from the ground onto a vehicle, values of a force acting on a main cylinder of the hooklift are determined at predetermined intervals of a physical quantity that varies as a function of the movement of the hooklift, and the weight of the demountable platform is calculated using the determined values of the force. The present invention also relates to a system for determining the weight of a demountable platform.

11 Claims, 2 Drawing Sheets

(56) References Cited

U.S. PATENT DOCUMENTS

| | | | |
|---|---|---|---|
| 5,601,393 A * | 2/1997 | Waldschmitt | B60P 1/16 |
| | | | 414/471 |
| 5,929,389 A | 7/1999 | Keuper | |
| 6,703,569 B2 * | 3/2004 | Moore | G01G 19/083 |
| | | | 177/136 |
| 8,716,609 B2 * | 5/2014 | Pangrazio | G01G 19/08 |
| | | | 177/136 |
| 9,534,948 B2 * | 1/2017 | Lustenberger | G01G 19/12 |
| 10,583,766 B2 * | 3/2020 | Baldys | B60P 1/162 |
| 2010/0161185 A1 | 6/2010 | Marathe | |
| 2011/0196623 A1 * | 8/2011 | Hakkinen | G01M 1/122 |
| | | | 702/41 |
| 2013/0062127 A1 | 3/2013 | Pangrazio | |
| 2014/0069728 A1 | 3/2014 | Lustenberger | |
| 2016/0116328 A1 | 4/2016 | Kivi | |
| 2020/0096381 A1 * | 3/2020 | Siren | G01G 21/28 |

FOREIGN PATENT DOCUMENTS

| | | |
|---|---|---|
| EP | 3141420 A1 | 10/2019 |
| GB | 2461273 A | 12/2009 |
| JP | H08233640 A | 9/1996 |
| WO | 2008028993 A1 | 3/2008 |

OTHER PUBLICATIONS

European Search Report for EP Application No. 18 19 5702 dated Feb. 21, 2019 (2 pages).
European Search Report for EP Application No. 18 19 5708 dated Mar. 8, 2019 (2 pages).

* cited by examiner

METHOD AND SYSTEM FOR DETERMINING THE WEIGHT OF A DEMOUNTABLE PLATFORM

PRIORITY

This application claims priority of European patent application number 18195700.2 filed on Sep. 20, 2018 the contents of which is fully incorporated herein by reference.

TECHNICAL FIELD OF THE INVENTION

The present invention relates to a method and system for determining the weight of a demountable platform according to the preambles of the appended independent claims.

BACKGROUND OF THE INVENTION

Hooklifts are widely used in vehicles, such as trucks to quickly and easily handle demountable platforms. Hooklifts can perform several work tasks, such as loading, unloading, tipping and lowering of demountable platforms.

Hooklifts are known which can determine the weight of a demountable platform. An example of such a hooklift comprises moveable weight sensors. With this hooklift the demountable platform is weighted by lifting off the demountable platform from the chassis of the vehicle, moving the moveable weight sensors under the demountable platform and then lowering the demountable platform on the moveable weight sensors to be weighted.

A problem associated with the above and other known hooklifts provided with a weighing system is that the demountable platform must be lifted onto the vehicle before it can be weighted. Another problem associated with the known hooklifts is that because the demountable platform must be lifted onto the vehicle before it can be weighted, the weight data cannot be utilised during the lifting process, for example, in controlling a main cylinder of the hooklift or preventing the hooklift from being overloaded due to a too heavy load. Still another problem associated with the known hooklifts is that weight sensors are needed in determining the weight of the demountable platform. Still another problem associated with the known hooklifts is that the weighing of the demountable platform is time-consuming.

SUMMARY OF THE INVENTION

It is the main objective of the present invention to reduce or even eliminate the prior art problems presented above.

It is an objective of the present invention to provide a method and system for determining the weight of a demountable platform. In more detail, it is an objective of the present invention to provide a method and system enabling to determine the weight of a demountable platform during the lifting of the demountable platform from the ground onto a vehicle. It is a further objective of the invention to provide a method and system enabling to determine the weight of a demountable platform without using weight sensors. It is a further objective of the invention to provide a method and system enabling to quickly and easily determine the weight of a demountable platform.

In order to realise the above-mentioned objectives, the method and system according to the invention are characterised by what is presented in the characterising portions of the appended independent claims. Advantageous embodiments of the invention are described in the dependent claims.

A method for determining the weight of a demountable platform according to the invention comprises using a hooklift to lift the demountable platform from the ground onto a vehicle, measuring a physical quantity that varies as a function of the movement of the hooklift, determining, at predetermined intervals of the physical quantity, values of a force acting on a main cylinder of the hooklift, and calculating the weight of the demountable platform using the determined values of the force.

The method according to the invention is based on determining values of the force acting on the main cylinder of the hooklift at predetermined intervals of the physical quantity that varies as a function of the movement of the hooklift, and then calculating the weight of the demountable platform using these determined values. The physical quantity can be any physical quantity that varies during the lifting of the demountable platform. The physical quantity can be, for example, an angle between a middle frame and a subframe of the hooklift, or a position of a piston rod of the main cylinder.

The force acting on the main cylinder, i.e. the load force of the main cylinder, varies during the lifting of the demountable platform. The values of the force, at predetermined intervals of the physical quantity, can be determined, for example, based on pressures in a bottom chamber and a piston rod chamber of the main cylinder, based on a pressure in a hydraulic pump of a hydraulic system that is connected to and used to control the main cylinder, or based on a strain in the main cylinder.

The number of the values of the force that are determined during the lifting of the demountable platform can be, for example, a few tens or a few hundreds. The number of the values of the force can be, for example, 10-50, 50-200 or 200-1000. The accuracy of the method can be improved by increasing the number of the determined values of the force. The values of the force can be determined at any phase of the lifting. If the values of the force are determined at an early phase of the lifting, an estimate of the weight of the demountable platform can be utilized in controlling the main cylinder of the hooklift during the rest of the lifting process. With an early estimate of the weight of the demountable platform, the overloading of the hooklift due to a too heavy load can be easily prevented. In order to improve weighing accuracy, the values of the force should be determined during a longer lifting phase. Preferably, the values of the force are determined at predetermined intervals throughout the whole lifting process. The values of the force can be determined at uniform intervals of the physical quantity.

The weight of the demountable platform can be calculated in different ways using the determined values of the force. The calculation can be based, for example, on a discrete integral of the force over the physical quantity. This result can then be compared to a stored reference data with known weights to obtain the weight of the demountable platform. Instead of calculating the discrete integral, the determined values of the force can be simply summed together and then the result can be compared to a stored reference data with known weights. Before the calculation, the determined values of the force can be modified, for example, by subtracting from them the values obtained by a measurement that was carried out without a demountable platform. The stored reference data can be updated regularly or when required. After the weight of the demountable platform has been calculated, the weight of the load that is placed on the demountable platform can be calculated by subtracting the weight of the empty demountable platform from the calculated weight.

The calculation of the weight of the demountable platform can be implemented in hardware, software, or a combination of hardware and software components. Hardware components may comprise a processor for processing data and a storage medium for storing the data. Software components may be in the form of computer-readable program code stored in a computer-readable storage medium such as memory, mass storage device, or removable storage device. For example, a computer-readable medium may comprise computer-readable code for performing the function of a particular component. Likewise, computer memory may be configured to include one or more components, which may then be executed by a processor. Components may be implemented separately in multiple modules or together in a single module.

The method according to the invention can be applied in a hooklift that is attached to a vehicle, such as a truck, for handling a demountable platform. Such a hooklift comprises a tipping frame, which is connected through a tipping joint to a subframe of the hooklift.

The tipping frame is arranged to be moved relative to the subframe by one or more main cylinders, which can be, for example, double-acting differential cylinders. The bottom side of the main cylinder is attached to the subframe and the piston rod of the main cylinder is attached to the tipping frame. The subframe is attached to a chassis of the vehicle.

The main cylinder of the hooklift is controlled with a hydraulic system. The hydraulic system may comprise a hydraulic pump, a control valve and a load holding valve, which are hydraulically connected to the main cylinder. The control valve is configured to coarse control the movement of the main cylinder, i.e. to define whether the main cylinder moves or not and to which direction. Fine control of the main cylinder movement can be achieved with the load holding valve.

The tipping frame of the hooklift comprises a sliding frame, a middle frame and a rear frame. The sliding frame comprises a hook with which the hooklift can releasably attach to the demountable platform. The sliding frame is connected to the middle frame in such a manner that part of the sliding frame is arranged inside the middle frame, and that the sliding frame can be moved relative to the middle frame. The middle frame is connected to the rear frame through a middle frame joint, and the rear frame is connected to the subframe through the tipping joint.

The hooklift comprises a lock for locking the rear frame in parallel with the subframe when the hooklift is used to load the demountable platform from the ground onto the vehicle or to unload the demountable platform from the vehicle onto the ground. The hooklift comprises rear rollers that are mounted close to the tipping joint enabling the demountable platform to be easily moved with the hooklift during the loading and unloading of the demountable platform. Supporting beams provided to the underside of the demountable platform are intended to rest on the rear rollers. The hooklift comprises another lock for locking the middle frame in a parallel direction with the rear frame when the demountable platform is tipped. The hooklift may also comprise locks for locking the demountable platform to the hooklift when the demountable platform is transported by the vehicle.

In the method according to the invention the hooklift is used to lift the demountable platform from the ground onto the vehicle. This is done by locking the rear frame to the subframe and rotating with the main cylinder(s) the middle frame around the middle frame joint into a position where the hook can attach the demountable platform as the vehicle is reversed towards the demountable platform. After the hook is attached to the demountable platform, the middle frame is rotated by driving the main cylinder(s) inwards. As a result, the front end of the demountable platform rises off the ground. After a certain time, the demountable platform comes into contact with the rear rollers and also the back end of the demountable platform rises off the ground. The demountable platform is now supported by the hook and the rear rollers. The middle frame is rotated until it is essentially parallel with the rear frame. The position of the demountable platform on the tipping frame can be adjusted by moving the sliding frame relative to the middle frame.

An advantage of the method according to the invention is that the weight of a demountable platform can be determined during the lifting of the demountable platform. Another advantage of the method according to the invention is that because the weight of a demountable platform can be determined at an early phase of the lifting process, the weight data can be utilised during the rest of the lifting process, for example, in controlling the speed of a main cylinder of the hooklift or preventing the hooklift from being overloaded due to a too heavy load. Still another advantage of the method according to the invention is that the weight of a demountable platform can be determined without any weight sensors. Still another advantage of the method according to the invention is that it enables to quickly and easily determine the weight of a demountable platform.

According to an embodiment of the invention the weight of the demountable platform is calculated by integrating the force over the physical quantity and comparing the result to stored reference data. The integral is calculated with a discrete integral of the values of the force over the values of the physical quantity. The result is compared to the stored reference data with known weights to obtain the weight of the demountable platform. Before the calculation, the determined values of the force can be modified, for example, by subtracting from them the values obtained by a measurement that was carried out without a demountable platform. The stored reference data can be updated regularly or when required.

According to an embodiment of the invention the physical quantity is an angle between a middle frame and a subframe of the hooklift. The angle between the middle frame and the subframe can be determined with inclinometers, which are attached to the middle frame and the subframe. When the hooklift begins to lift the demountable platform from the ground, the angle between the middle frame and the subframe is about 120 to 150 degrees. During the lifting process, the angle between the middle frame and the subframe becomes smaller until at the end of the lifting process the angle is about 0 degrees. The values of the force acting on the main cylinder of the hooklift can be determined during the lifting of the demountable platform, for example, at intervals of 0.1 to 5 degrees or 0.5 to 2 degrees, or at an interval of 1 degree of the angle between the middle frame and the subframe.

According to an embodiment of the invention the physical quantity is a position of a piston rod of the main cylinder. The position of the piston rod can be measured, for example, with a displacement sensor attached to the main cylinder, or with a non-contact sensor arranged in connection with the main cylinder. Examples of non-contact sensors are optical and electromagnetic sensors. The values of the force acting on the main cylinder of the hooklift can be determined during the lifting of the demountable platform, for example, at intervals of 0.1 to 5 cm or 0.5 to 2 cm, or at an interval of 1 cm of the position of the piston rod.

According to an embodiment of the invention the values of the force acting on the main cylinder of the hooklift are determined by measuring, with pressure sensors, pressures in a bottom chamber and a piston rod chamber of the main cylinder, or by measuring, with a pressure sensor, a pressure in a hydraulic pump connected to the main cylinder. The force acting on the main cylinder can be calculated from the chamber pressures by multiplying the pressures with the piston areas in either chamber.

According to an embodiment of the invention the values of the force acting on the main cylinder of the hooklift are determined by measuring, with a strain gauge, a strain in the main cylinder. The strain gauge can be arranged to measure the strain of a piston rod of the main cylinder.

The present invention also relates a system for determining the weight of a demountable platform. The system according to the invention comprises a hooklift for lifting the demountable platform from the ground onto a vehicle, means for measuring a physical quantity that varies as a function of the movement of the hooklift, means for determining, at predetermined intervals of the physical quantity, values of a force acting on a main cylinder of the hooklift, and means for calculating the weight of the demountable platform using the determined values of the force.

An advantage of the system according to the invention is that the weight of a demountable platform can be determined during the lifting of the demountable platform. Another advantage of the system according to the invention is that it does not comprise weight sensors. Still another advantage of the system according to the invention is that it enables to quickly and easily determine the weight of a demountable platform.

According to an embodiment of the invention the means for measuring the physical quantity that varies as a function of the movement of the hooklift comprises inclinometers attached to a middle frame and a subframe of the hooklift for measuring an angle between the middle frame and the subframe of the hooklift, or a displacement sensor attached to the main cylinder or a non-contact sensor arranged in connection with the main cylinder for measuring a position of a piston rod of the main cylinder.

According to an embodiment of the invention the means for determining values of the force acting on the main cylinder of the hooklift comprises pressure sensors for measuring pressures in a bottom chamber and a piston rod chamber of the main cylinder, a pressure sensor for measuring a pressure in a hydraulic pump connected to the main cylinder, or a strain gauge for measuring a strain in the main cylinder.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated.

The exemplary embodiments presented in this text and their advantages relate by applicable parts to the method as well as the system according to the invention, even though this is not always separately mentioned.

DETAILED DESCRIPTION OF THE INVENTION

Figure 1:
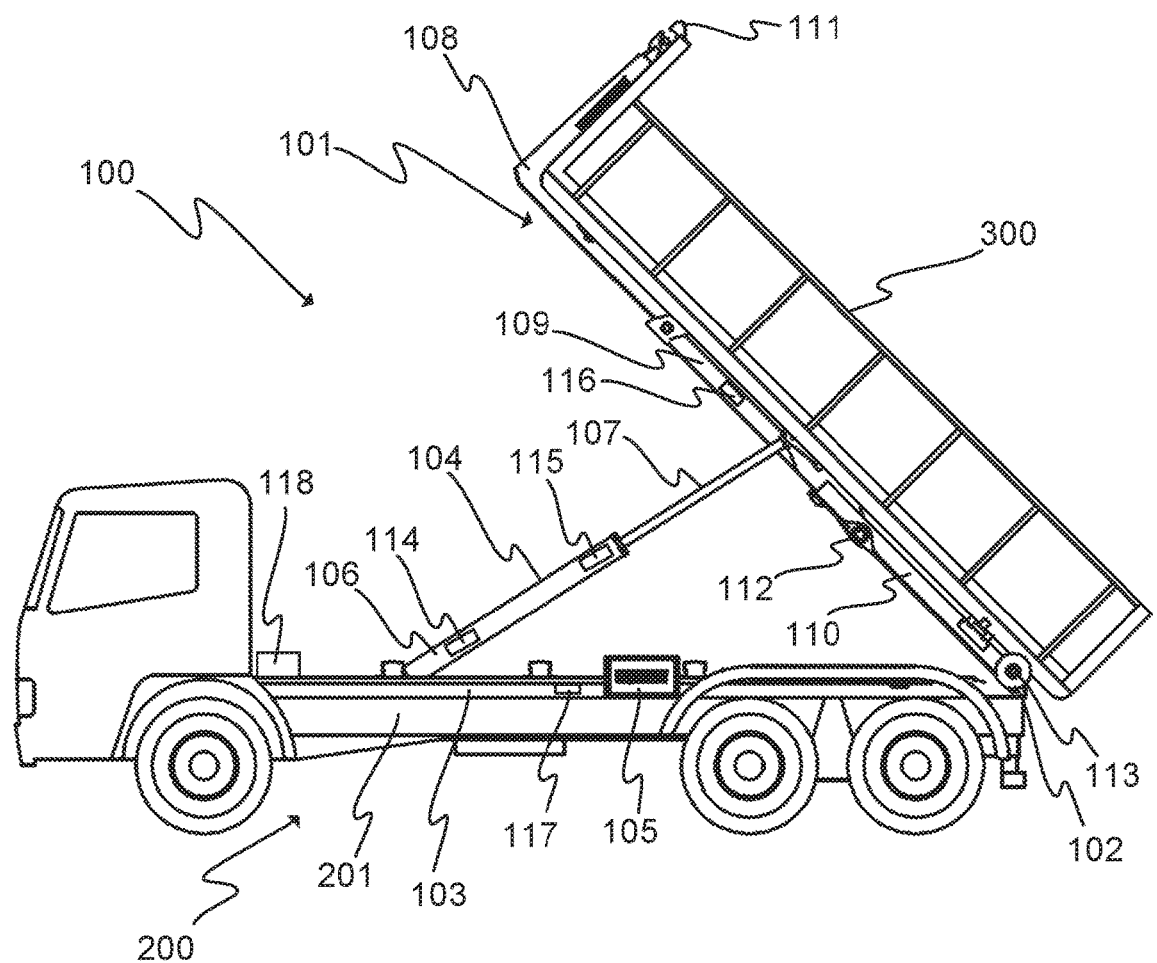
FIG. 1 illustrates an example of a hooklift assembled on a truck.

Now, referring to the drawing the invention is described in further details.

FIG. 1 illustrates an example of a hooklift 100 that is assembled on a truck 200. The hooklift 100 comprises a tipping frame 101, which is connected through a tipping joint 102 to a subframe 103 of the hooklift 100. The tipping frame 101 is arranged to be moved relative to the subframe 103 by two parallel main cylinders 104, which are controlled with a hydraulic system 105. The bottom sides 106 of the main cylinders 104 are attached to the subframe 103 and the piston rods 107 of the main cylinders 104 are attached to the tipping frame 101. The subframe 103 is attached to a chassis 201 of the truck 200.

The tipping frame 101 comprises a sliding frame 108, a middle frame 109 and a rear frame 110. The sliding frame 108 comprises a hook 111 with which the hooklift 100 is releasably attached to a demountable platform 300. The sliding frame 108 is connected to the middle frame 109 in such a manner that part of the sliding frame 108 is arranged inside the middle frame 109, and that the sliding frame 108 can be moved relative to the middle frame 109. The middle frame 109 is connected to the rear frame 110 through a middle frame joint 112, and the rear frame 110 is connected to the subframe 103 through the tipping joint 102. The hooklift 100 comprises locks (not shown in FIG. 1) with which the relative movement of parts of the hooklift 100 can be prevented. The hooklift 100 also comprises locks (not shown in FIG. 1) for locking the demountable platform 300 to the subframe 103 when the demountable platform 300 is transported by the truck 200.

During loading of the demountable platform 300 onto the truck 200 and unloading of the demountable platform 300 from the truck 200, the rear frame 110 is locked to the subframe 103, and the middle frame 109 is rotated around the middle frame joint 112 by using the main cylinders 104. Rear rollers 113 that are mounted close to the tipping joint 102 enable the demountable platform 300 to be easily moved with the hooklift 100 during the loading and unloading work tasks. During tipping and lowering of the demountable platform 300, the middle frame 109 is locked in parallel direction with the rear frame 110 (as shown in FIG. 1), and the rear frame 110 is rotated around the tipping joint 102 by using the main cylinders 104. The position of the demountable platform 300 on the tipping frame 101 can be changed by moving the sliding frame 108 relative to the middle frame 109.

The hooklift 100 comprises pressure sensors 114 and 115 for measuring a pressure in a bottom chamber and a piston rod chamber of the main cylinder 104, respectively. The force acting on the main cylinder 104 can be determined based on the pressures in the bottom and piston rod chambers.

The hooklift 100 comprises inclinometers 116 and 117, which are attached to the middle frame 109 and the subframe 103, respectively. By using the inclinometers 116 and 117, an angle between the middle frame 109 and the subframe 103 can be determined, which angle varies as a function of the movement of the main cylinder 104.

The hooklift 100 comprises a data processing unit 118 for processing and storing the data received from the pressure sensors 114 and 115, and from the inclinometers 116 and 117. The data processing unit 118 is configured to determine the angle between the middle frame 109 and the subframe 103 based on the signals received from the inclinometers 116 and 117, and to determine, at predetermined intervals of the angle, values of the force acting on the main cylinder 104 of the hooklift 100 based on the signals received from the pressure sensors 114 and 115. The data processing unit 118 is also configured to calculate the weight of the demountable platform 300 by using the determined values of the force.

Figure 2A:
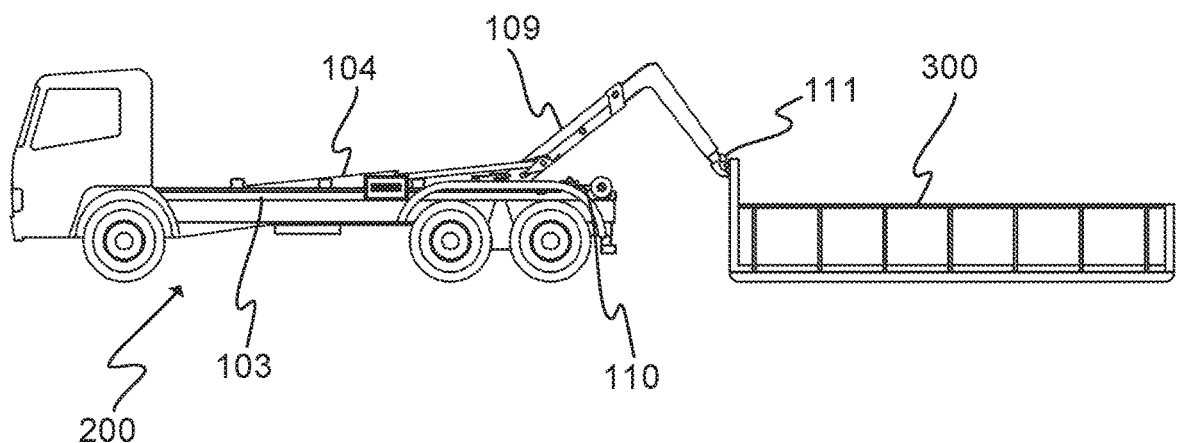
FIGS. 2A-2C illustrate a method according to an embodiment of the invention for determining the weight of a demountable platform.
Figure 2B:
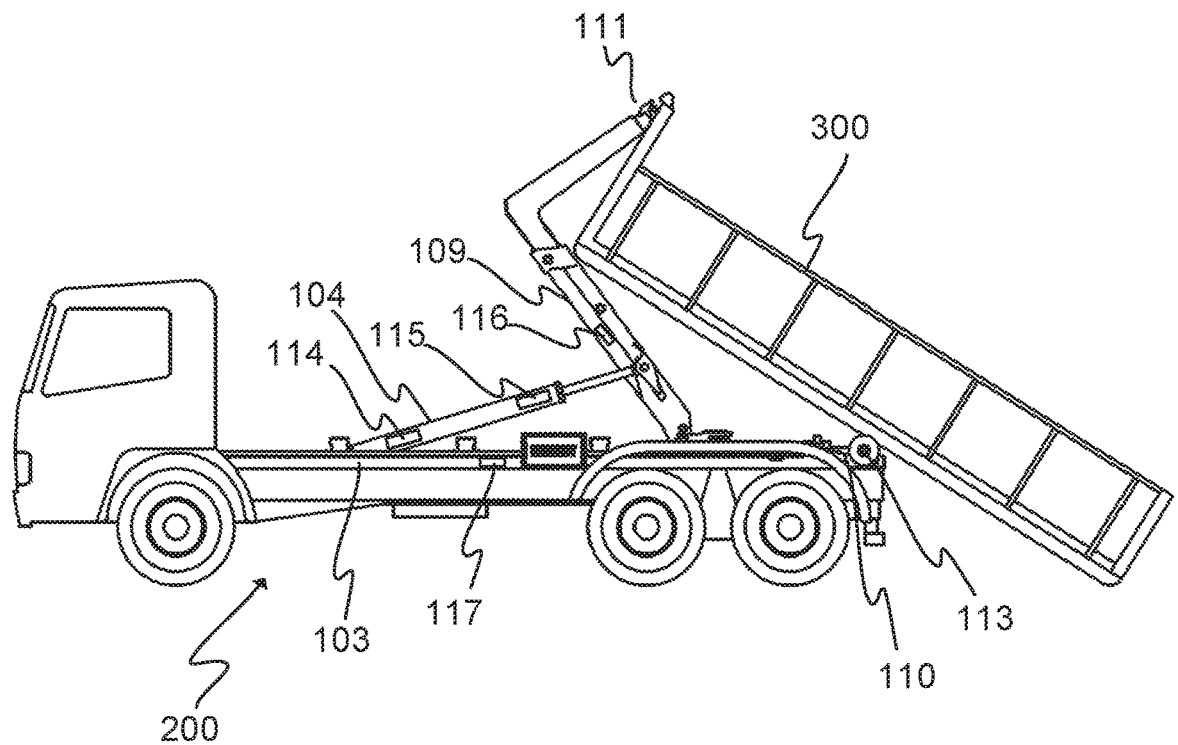
Figure 2C:
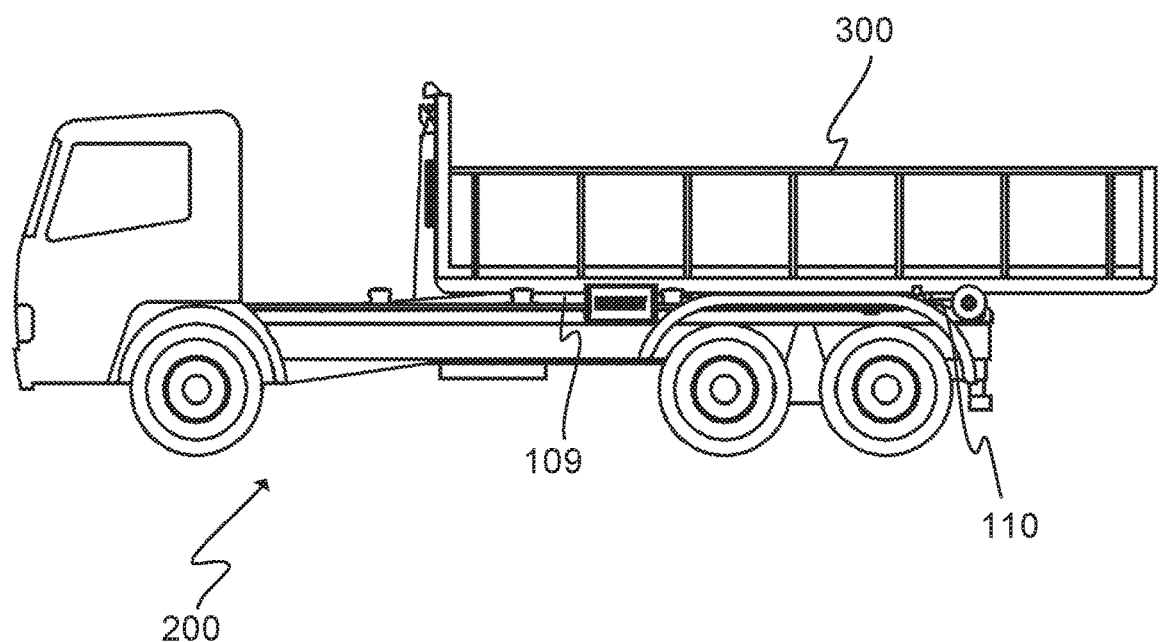

FIGS. 2A-2C illustrate a method according to an embodiment of the invention for determining the weight of the demountable platform 300. In FIG. 2A, there is shown a situation where the truck 200 has been reversed to the demountable platform 300. The middle frame 109 is at an angle that enabled the attachment of the hook 111 to the demountable platform 300.

The lifting of the demountable platform 300 is done by driving the main cylinders 104 inwards. As a result, the middle frame 109 rotates relative to the subframe 103, and the front end of the demountable platform 300 rises off the ground. The rear frame 110 is held locked to the subframe 103 during the lifting of the demountable platform 300.

After a certain time as the lifting of the demountable platform 300 is continued, the demountable platform 300 comes into contact with the rear rollers 113, as shown in FIG. 2B. When the main cylinders 104 are driven further inwards, also the back end of the demountable platform 300 rises off the ground, and the demountable platform 300 becomes supported by the hook 111 and the rear rollers 113. The middle frame 109 is rotated until it becomes essentially parallel with the rear frame 110. The demountable platform 300 rests now on the truck 200, as shown in FIG. 2C.

During the lifting of the demountable platform 300 from the ground onto the truck 200, an angle between the middle frame 109 and the subframe 103 is measured by using the inclinometers 116 and 117. The values of the force acting on the main cylinder 104 are determined, at predetermined intervals of the angle, by measuring with the pressure sensors 114 and 115 pressures in the bottom and piston rod chambers of the main cylinder 104 and then multiplying the pressures with the piston areas in either chamber. The weight of the demountable platform 300 is then calculated based on the determined values of the force.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A method for determining the weight of a demountable platform, comprising:
    using a hooklift to lift the demountable platform from the ground onto a vehicle,
    measuring a physical quantity that varies as a function of the movement of the hooklift, determining, at predetermined intervals of the physical quantity, values of a force acting on a main cylinder of the hooklift, and
    calculating the weight of the demountable platform based on a discrete integral of the determined values of the force over the physical quantity.

2. The method according to claim 1, wherein the weight of the demountable platform is calculated by integrating the force over the physical quantity and comparing a result of the discrete integral to stored reference data.

3. The method according to claim 1, wherein the physical quantity is an angle between a middle frame and a subframe of the hooklift.

4. The method according to claim 3, wherein the angle between the middle frame and the subframe is determined with inclinometers attached to the middle frame and the subframe.

5. The method according to claim 1, wherein the physical quantity is a position of a piston rod of the main cylinder.

6. The method according to claim 5, wherein the position of the piston rod is measured with a displacement sensor attached to the main cylinder, or with a non-contact sensor arranged in connection with the main cylinder.

7. The method according to claim 1, wherein the values of the force acting on the main cylinder of the hooklift are determined by measuring, with pressure sensors, pressures in a bottom chamber and a piston rod chamber of the main cylinder, or by measuring, with a pressure sensor, a pressure in a hydraulic pump connected to the main cylinder.

8. The method according to claim 1, wherein the values of the force acting on the main cylinder of the hooklift are determined by measuring, with a strain gauge, a strain in the main cylinder.

9. A system for determining the weight of a demountable platform, comprising:
    a hooklift for lifting the demountable platform from the ground onto a vehicle,
    means for measuring a physical quantity that varies as a function of the movement of the hooklift,
    means for determining, at predetermined intervals of the physical quantity, values of a force acting on a main cylinder of the hooklift, and
    means for calculating the weight of the demountable platform using the determined values of the force, the calculating being based on a discrete integral of the determined values of the force over the physical quantity.

10. The system according to claim 9, wherein the means for measuring the physical quantity that varies as a function of the movement of the hooklift comprises inclinometers attached to a middle frame and a subframe of the hooklift for measuring an angle between the middle frame and the subframe of the hooklift, or a displacement sensor attached to the main cylinder or a non-contact sensor arranged in connection with the main cylinder for measuring a position of a piston rod of the main cylinder.

11. The system according to claim 9, wherein the means for determining values of the force acting on the main cylinder of the hooklift comprises pressure sensors for measuring pressures in a bottom chamber and a piston rod chamber of the main cylinder, a pressure sensor for measuring a pressure in a hydraulic pump connected to the main cylinder, or a strain gauge for measuring a strain in the main cylinder.

* * * * *